United States Patent
Shamma et al.

(10) Patent No.: US 11,328,178 B2
(45) Date of Patent: May 10, 2022

(54) SYSTEM AND METHOD FOR AUTOMATED PHOTO-IDEOPHONE MATCHING AND PLACEMENT

(71) Applicant: FUJIFILM Business Innovation Corp., Tokyo (JP)

(72) Inventors: David Ayman Shamma, San Francisco, CA (US); Lyndon Kennedy, San Francisco, CA (US); Anthony Dunnigan, Palo Alto, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 261 days.

(21) Appl. No.: 16/817,364

(22) Filed: Mar. 12, 2020

(65) Prior Publication Data

US 2021/0287039 A1    Sep. 16, 2021

(51) Int. Cl.
*G06K 9/62* (2022.01)
*G06F 40/169* (2020.01)
*G06F 40/242* (2020.01)
*G06V 40/16* (2022.01)

(52) U.S. Cl.
CPC ......... *G06K 9/6255* (2013.01); *G06F 40/169* (2020.01); *G06F 40/242* (2020.01); *G06K 9/6267* (2013.01); *G06V 40/161* (2022.01); *G06V 40/172* (2022.01); *G06V 40/174* (2022.01)

(58) Field of Classification Search
CPC .... G06K 9/6255; G06K 9/6267; G06K 9/627; G06F 40/169; G06F 40/242; G06F 40/30; G06V 40/161; G06V 40/172; G06V 40/174; G06V 20/20
See application file for complete search history.

(56) References Cited

U.S. PATENT DOCUMENTS

| | | | |
|---|---|---|---|
| 9,858,496 B2 * | 1/2018 | Sun | G06K 9/3233 |
| 11,055,566 B1 * | 7/2021 | Pham | G06K 9/6271 |
| 2002/0101519 A1 | 8/2002 | Myers | |

(Continued)

FOREIGN PATENT DOCUMENTS

CN        202443465 U        9/2012

OTHER PUBLICATIONS

Fujieda, S., et al., An Image Generation System of Delicious Food in a Manga Style, SIGGRAPH Asia 2017, Bangkok, Thailand, Nov. 27-30, 2017, 2 pgs.

(Continued)

*Primary Examiner* — Wesley J Tucker
(74) *Attorney, Agent, or Firm* — Procopio, Cory, Hargreaves & Savitch LLP

(57) ABSTRACT

A computer-implemented method of associating an annotation with an object in an image, comprising generating a dictionary including first vectors that associate terms of the annotation with concepts, classifying the image to generate a second vector based on classified objects and associated confidence scores for the classified objects, selecting a term of the terms associated with one of the first vectors having a shortest determined distance to the second vector, identifying a non-salient region of the image, and rendering the annotation associated with the selected term at the non-salient region.

20 Claims, 13 Drawing Sheets
(8 of 13 Drawing Sheet(s) Filed in Color)

(56) References Cited

U.S. PATENT DOCUMENTS

| | | | |
|---|---|---|---|
| 2012/0045132 A1* | 2/2012 | Wong | G06K 9/4676 |
| | | | 382/195 |
| 2019/0095467 A1* | 3/2019 | Kislyuk | G06F 16/5838 |
| 2019/0238952 A1* | 8/2019 | Boskovich | H04N 21/23418 |
| 2020/0160042 A1* | 5/2020 | Bui | G06N 3/0454 |
| 2020/0380258 A1* | 12/2020 | Yu | G06K 9/00671 |
| 2020/0394434 A1* | 12/2020 | Rao | G06T 3/40 |
| 2021/0019287 A1* | 1/2021 | Prasad | G06K 9/6271 |
| 2021/0027083 A1* | 1/2021 | Cohen | G06K 9/6271 |
| 2021/0027471 A1* | 1/2021 | Cohen | G06N 3/04 |
| 2021/0110587 A1* | 4/2021 | Aggarwal | G06F 40/106 |

OTHER PUBLICATIONS

Matsumura, K., et al., CameraMatch: Automatic Recognition of Subjects Using Smartphones—Toward Entertaining Photo Sessions, CHI'13 Extended Abstracts on Human Factors in Computing Systems on CHI EA '13, 2013, 6 pgs.

Pennington, J., et al., GloVe: Global Vectors for Word Representation, Empirical Methods in Natural Language Processing (EMNLP), 2014, pp. 1532-1543.

Umeda, D., et al., Real-Time Manga-Like Depiction Based on Interpretation of Bodily Movements by Using Kinect, SIGGRAPH Asia 2012 Technical Briefs on—SA '12, 2012, 4 pgs.

Wong, T-T. et al., Computational Manga and Anime, SIGGRAPH Asia 2013 Course Notes on—SA '13, 2013, 52 pgs.

\* cited by examiner

400

500

*800*

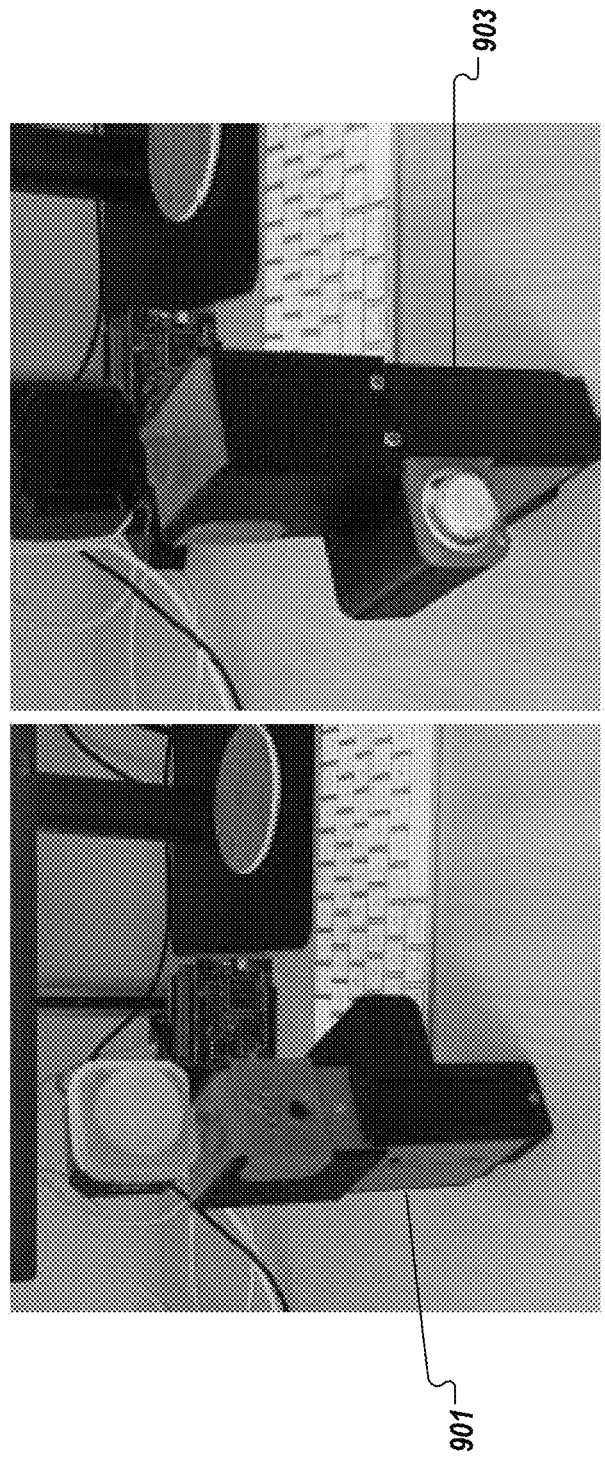

SYSTEM AND METHOD FOR AUTOMATED PHOTO-IDEOPHONE MATCHING AND PLACEMENT

BACKGROUND

Field

Aspects of the example implementations relate to methods, systems and user experiences associated with automated matching and placement of an ideophone on a photo, and more specifically, automated placement of onomatopoeia in a non-salient portion of an image with respect to an object.

Related Art

In the related art, camera effects are a popular approach to providing personalization to photos. As personal cameras and online photo apps have integrated with social media and messaging applications, camera effects have grown in popularity. In the related art, stickers and annotations are used with online applications. For example, a user may review a sticker book to select an annotation, or receive one or more geo-recommended annotations.

However, related art approaches to photo annotations are one dimensional. The recommendation of annotations do not bear any relationship to the actual content of the photo itself, although the annotations may bear some relation to the geo-location of the photo. Some related art systems may recommend an object name to be placed manually on the photo by the user. However, those related art systems do not capture the expression nature of ideophones (e.g., words that evoke an idea that is sensory, such as a vivid impression of certain sensations or sensory perceptions, such as sound, movement, color, shape for action), including but not limited to onomatopoeia (i.e., a sound ideophone), such as is seen in related art comic strips.

FIGS. 1A-1B illustrate related art approaches 100 to photo annotations (source: https://en.wikipedia.org/wiki/Onomatopoeia). In these approaches, ideophone and onomatopoeia matching may be conducted in a related art approach, such as a manually curated lookup table that links items or objects to terms (e.g., the object "clock" to the term "tic-toc").

However, such related art tables require manual effort, and must be repeated for each language, as well as each related mapping, due to their static nature. For example, in these related art illustrations 100, if the mapping of "clock->tic-toc" was created, then another mapping of "watch->tic-toc" would need to be added for that relationship to be added.

Accordingly, there is an unmet need to overcome the issues associated with the related art photo annotation approaches.

SUMMARY

According to an aspect of the example implementations, a computer-implemented method of associating an annotation with an object in an image is provided, comprising generating a dictionary including first vectors that associate terms of the annotation with concepts, classifying the image to generate a second vector based on classified objects and associated confidence scores for the classified objects, selecting a term of the terms associated with one of the first vectors having a shortest determined distance to the second vector, identifying a non-salient region of the image, and rendering the annotation associated with the selected term at the non-salient region.

Example implementations may also include a non-transitory computer readable medium having a storage and processor, the processor capable of executing instructions for associating an annotation with an object in an image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 9A-9B illustrate a hardware implementation according to the example implementations.

DETAILED DESCRIPTION

Figures 1A, 1B:
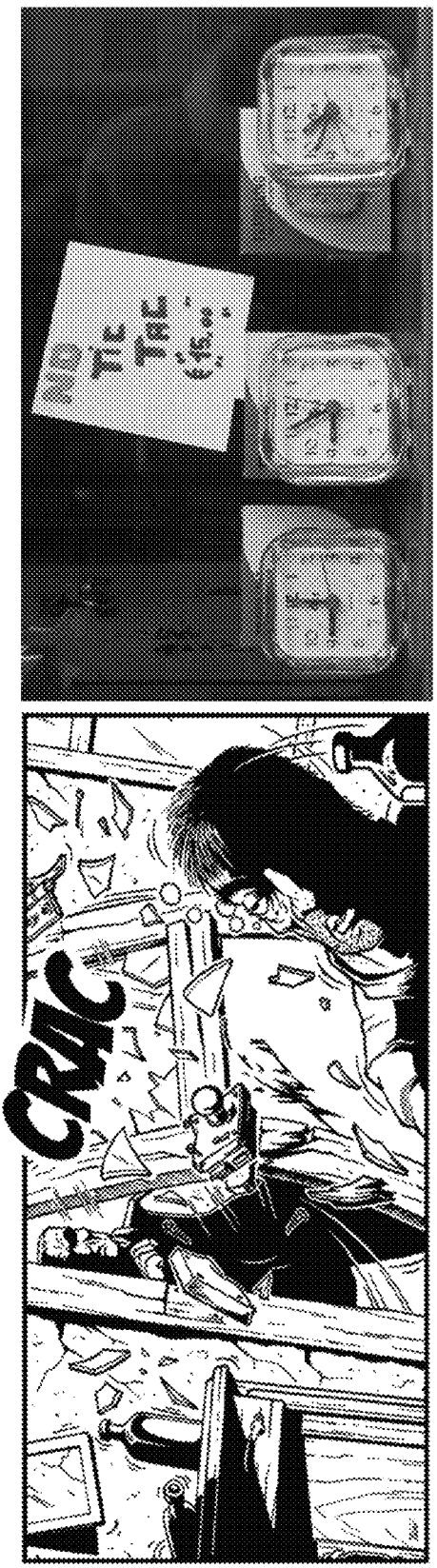
FIGS. 1A-1B illustrate related art approaches to photo annotations.

The following detailed description provides further details of the figures and example implementations of the present application. Reference numerals and descriptions of redundant elements between figures are omitted for clarity. Terms used throughout the description are provided as examples and are not intended to be limiting.

Aspects of the example implementations are directed to systems and methods for providing an automated set of recommendations, based on the content of a photo. The recommendations are related to sounds and concepts that are represented in the photo. Automatic positioning and compositing of the annotation is performed. As a result, the user may digitally save or print an annotated final photo without requiring any additional user interface or interaction, other than the actuation of the camera capture command, such as operation of a shutter of a camera.

The example implementations include systems and methods associated with automatically creating a mapping between an object or item on a photo and a term for an ideophone or onomatopoeia associated with the object or item, and placement of the term in a non-salient region of the image for the user, without requiring a user interaction. Alternatively, the user may be provided with a suggestion instead of an automatic placement.

More specifically, optical analysis on contours of the image to identify a region (e.g., quadrant) having the least salience to the object or item. As a result, the user may have additional enjoyment of annotations, and be able to have additional opportunities to share the photos with other users, taking an ideophone-focused approach.

According to a use case of the example implementations, a user may captures an image, such as taking a photograph with a camera app, or an image capture device such as a camera or video recorder, or selects a photo from a photo collection. Then, the system recommends an annotation for the user. Optionally, the system may automatically render the annotation on the photo or print, based on the preference of the user.

For execution of the example implementations, the system must perform a setup, a matching and an execution. Optionally, the process may be optimized to execute in an embedded edge/AI device; however, the example implementations are not limited thereto, and other alternatives may be substituted therefor, such as use of a cloud connection.

Figure 2:
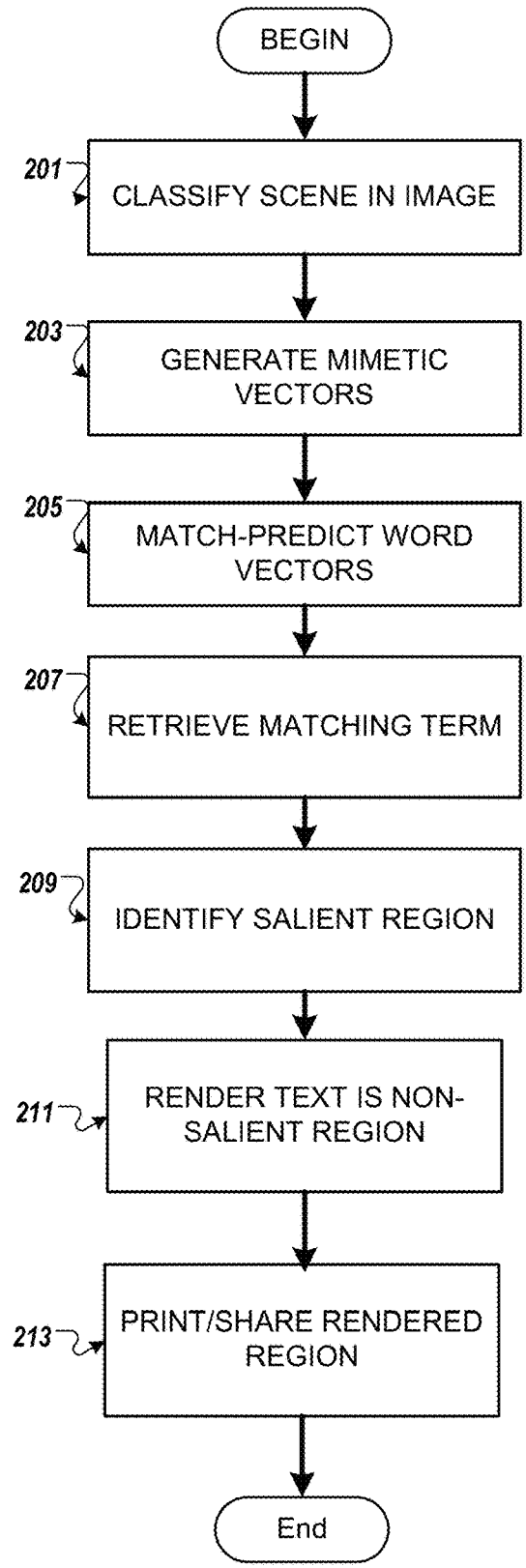
FIG. 2 illustrates a detailed flow according to the example implementations.

FIG. 2 illustrates a flow 200 associated with the system, according to the example implementations. At 201, by use of artificial intelligence classifiers (e.g., MobileNet), a scene in a photo is visually identified into one of people, food and objects (e.g., items). While three classes are used in the present example implementation, the present inventive concept is not limited thereto, and any number of classes may be substituted therefor in accordance with the example implementations, as would be understood by those skilled in the art.

Once the classification of 201 has been completed, mimetic vectors are generated at 203. At 205, word vectors are matched—predicted that to the closest dictionary definition. Then, at 207, the matching term is retrieved.

At 209, a salient region of the image is identified. The text is then rendered in a non-salient region of the image at 211. Accordingly, the image may be printed or shared (e.g., by the user) at 213.

Figure 3:
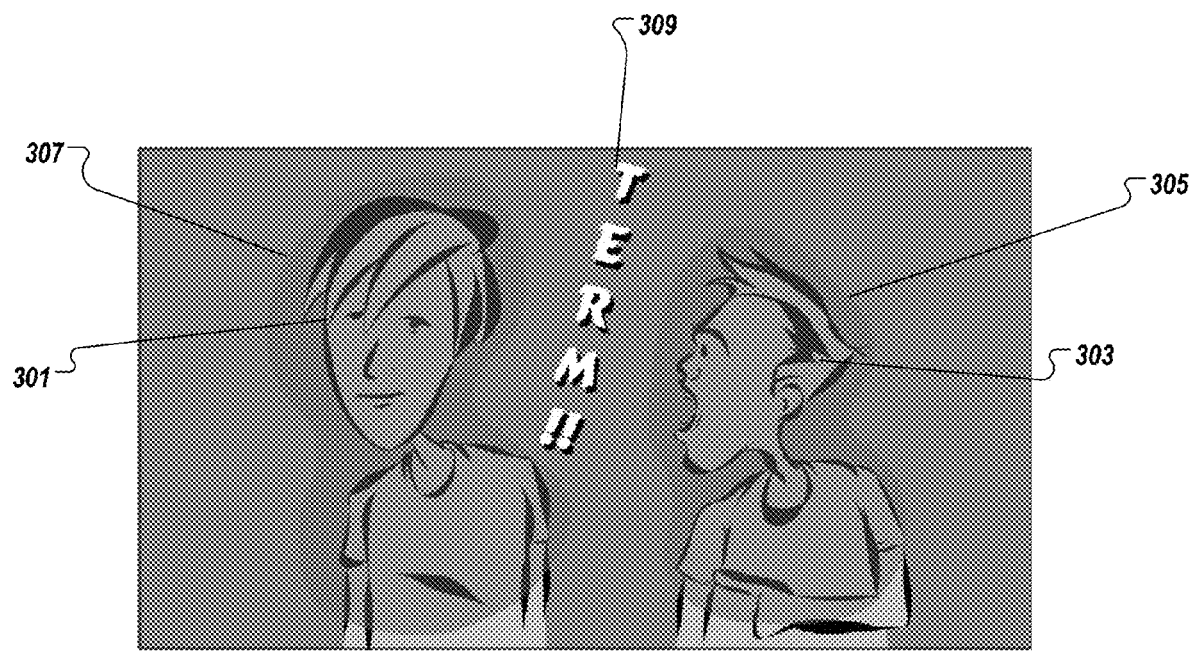
FIG. 3 illustrates an output according to the example implementations.

FIG. 3 illustrates an output according to the example implementations described herein. More specifically, an output 300 includes a first object 301 and a second object 303. The classifier determines, by visual identification that these objects 301, 303 are people. Accordingly, vectors, matching and retrieval of a term is performed, and the salient regions of the image are identified. More specifically, for person 301, salient region 307 is identified, and for person 303, salient region 305 is identified. Text is rendered in the non-salient region at 309.

As explained above, the system according to the example implementations requires a setup, a matching and then an execution. Aspects of the example implementations associated with the setup, the matching and the execution are described below.

For the setup, a dictionary of ideophones or onomatopoeia is required. For example, but not by way of limitation, for the entry of "tic-toc", the entry would provide a definition of "the sound of a mechanical clock's internal mechanism". However, the example implementations are not limited to a particular term or language.

For example, but not by way of limitation, the selection of terms may be language-independent (e.g., mix of English and Japanese) or language-specific (e.g., English only or Japanese only). Further, the example implementations may select terms within a language that are associated with the object (e.g., use of hiragana versus katakana in the Japanese language, depending on the result of the classification and scoring).

Once the dictionary has been generated, a scoring operation is performed for each definition. For example, the score may be constructed based on the term vector from the definition. According to one example implementation, the score may be generated based on the term vector from the definition using a GloVe (e.g., global vector for word vetting, directed to measurement of a co-occurrence metric trained across a large corpus) as noted in relationship (1):

$$\frac{\sum_{i=1}^{n} GloVe(t_i)}{n} \quad (1)$$

where GloVe(t) is the GloVe score for the given term t. While GloVe is used herein, other methods may be substituted therefor, as would be understood by those skilled in the art.

According to one example implementation, the scoring is performed on an edge device, using the pre-trained Wikipedia 2014+Gigaword 5 vector (6B tokens, 400 K vocabulary, uncased, 50-dimensional).

Upon completion of the scoring, the dictionary is optionally reduced to the term in the recognition vocabulary (e.g., sparse size reduction operation). In other words, the terms are reduced to the classes that the visual classifier can recognize. An output of the setup may be a dictionary that includes term-word pairs of about 50 dimensional vectors. In the case of a typical Japanese ideophone dictionary, about 25 entries may be generated.

As noted above, the present example implementations are directed to matching of terms for the visual classifier. However, the example implementations are not limited thereto. For example, but not by way of limitation, the context between objects within an image may be analyzed, and the matching function may be performed based on that context. Thus, the relation between objects in an image may be measured and encoded, and applied to the selection of the term.

Figure 4:
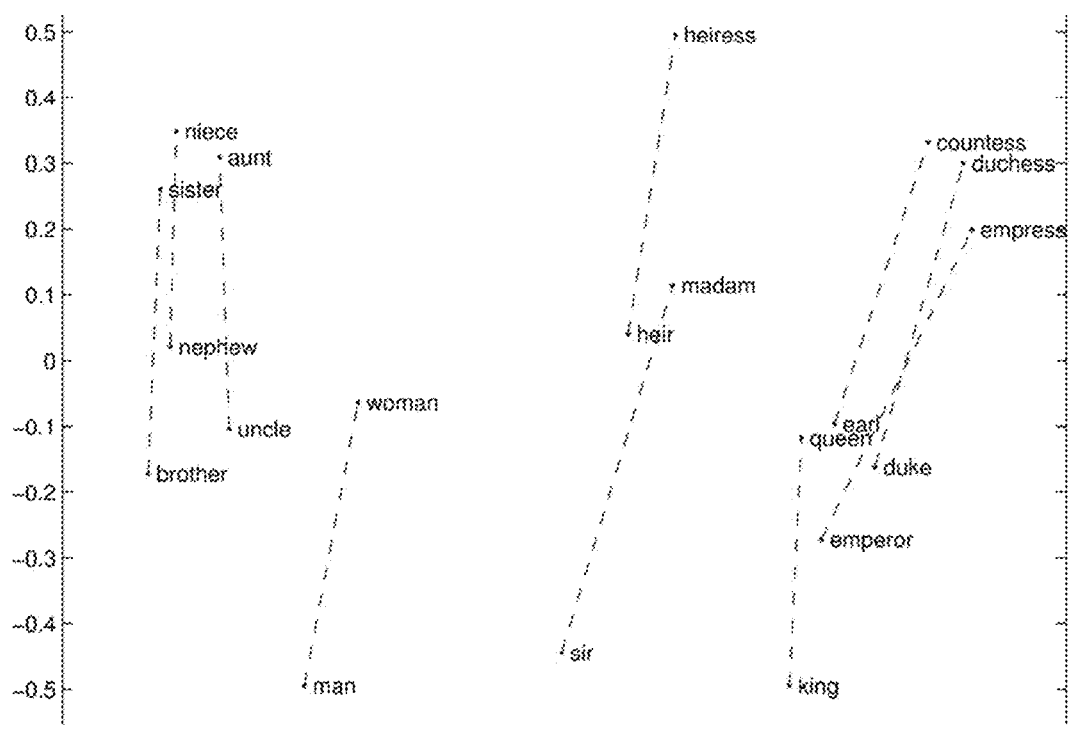
FIG. 4 illustrates a model associated with dictionary creation according to the example implementations.

As illustrated in FIG. 4, the GloVe model 400 is trained on the non-zero entries of a global word-word co-occurrence matrix. A tabulation is performed as to how frequently words co-occur with one another in a given corpus. This matrix may be populated by requiring a single pass through the entire corpus, to collect the statistics. For large corpora, this pass can be computationally heavy, as a one-time up-front cost.

Once the foregoing setup has been completed, the matching may be performed for an image. As explained above, the image may be one that is captured by a user, or selected from a pre-existing collection. Regardless of the manner of selection, for a given photo, a set of visual classifiers is run on the photo. In the present example implementation, the classifiers include a first classifier associated with facial detection and smiling, a second classifier associated with food, and a third classifier associated with one or more objects in the image (e.g., items). As explained above, the classifiers may be based on artificial intelligence roaches in a neural network, including but not limited to being trained on MobileNet.

Each classifier returns a set of classifier objects o and confidence scores for those objects $c_o$. For example but not by way of limitation, the smile classifier may return a floating-point score from 0 . . . 1 where 0 is a frown and 1 is a smile. For the sake of consistency, this may be reported as a smile or frown score in the 0 . . . 1 range by just losing resolution at a 0:5 threshold. Thus, the example implementations may provide an objective metric, such as a floating-point score between 0 and 1, that indicates how much the face in the photo is smiling or frowning.

For each classifier, a GloVe vector is generated, using a relationship similar to relationship (1), weighted by confidence $c_o$, as shown in relationship (2):

$$\frac{\sum_{j=1}^{n} c_{o_j} GloVe(o_j)}{n}$$

As a result, three 50-dimensional vectors are generated, one for each classifier. For each vector, the top five minimal cosine distances between the vector and the dictionary of vectors generated as described above is defined. The top five, as opposed to the top single minimum distance score, are selected to allow for jitter, to prevent a single term from being printed repeatedly. However, the present example implementation is not limited to a selection of the top five, and other selections may be substituted therefor without departing from the inventive scope.

Additionally, while cosine minimal cosine distance is described here and has demonstrated substantially superior performance in the present example implementation, it is a non-limiting example, and other distance measurement calculation approaches may be used. Accordingly, the closest vector is selected, and the associated term is recommended.

According to an example implementation, for an example photo, upon which the matching is performed. For example, a vector is generated for the photo, one for each classifier. In this context, the following computations are generated:

$V_{1\ (face/joy)}$=0.99 person, 0.95 smile
$V_{2\ (objects)}$=0.6 hat, 0.87 cup
$V_{3\ (food\ dishes)}$=0.0

More specifically, a vector is generated via a GloVe by use of confidence scores from the visual classifier, and using relationship (2) as explained above. As also noted above, the minimal cosine distance calculation is performed to each dictionary definition, and the term is retrieved.

In addition to selecting the term, the present example implementations may also detect sentiment relationships, and make adjustments to the retrieved term. For example, but not by way of limitation, depending on the output of the visual classifier and the generated vector, adjustments may be made with respect to font, color, language or other visual aspects. In one example implementation, depending on whether a smile or a frown detected on a face image, the font and/or color of the term to be rendered may be adjusted to match the smile or frown, which is explained above is associated with the floating-point score.

For example but not by way of limitation, a mapping between floating-point score and font or color may be generated, such that a gradient of font and color combinations is available that captures the sentiment in the image. Optionally, a user may be provided with a manner of personalizing the term, or filtering, redirecting or otherwise specifying fonts and/or colors that the user may associate with certain sentiments, such that the user's preference is incorporated into the mapping between the floating-point score and the font and/or color associated with the output term. Similarly, in the case of a black-and-white photo, image or video, use of a color annotation may be restricted, to avoid overpowering the object in the image. According to some example implementations a histogram may be used for color, tone, shape, etc., to associate color and/or font with a classification of the object as explained above.

Once the matching has been performed as explained above, with the selected photo and the matched term, the compositing is performed. More specifically, one or more methods may be employed to find non-salient regions in an image. According to the present example implementations, large contours are detected and defined, the photo is divided into a Cartesian plane based on its midpoint, and a quadrant containing the least contour overlap is identified. That identified quadrant may be composited and rendered with the term, optionally at a random size and angle that can be empirically thresholded, onto the image.

Because the placement is automatic, the user need not make a decision about the compositing and rendering, and need not even have a separate online application or user interface. Thus, the user may simply select the image, and then share the output with the ideophone annotation automatically placed thereon.

Figure 5A:
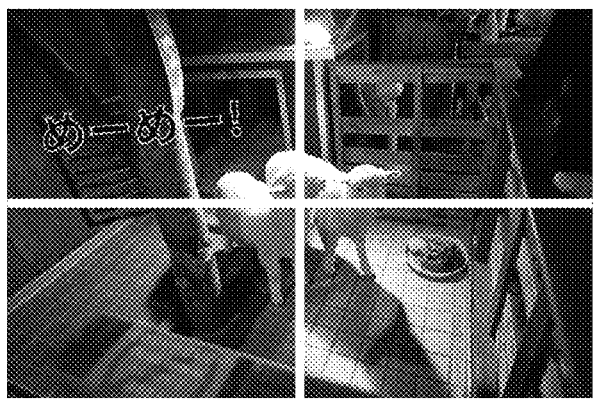
FIGS. 5A-5B illustrate outputs associated with saliency determination according to the example implementations.
Figure 5B:

FIGS. 5A-5B illustrate images 500 associated with the saliency determination according to the example implementations. As noted above, the example implementations of the present system and computer implemented operations are directed to find contours in the image, and break the image into a plurality of regions, in this case four quadrants. Then, a quadrant is selected that has the least contour overlap with the salient region. Then, the annotation is composited. In each of the illustrated images, the annotation can be seen in the region having the least overlap with the salient image.

In FIG. 5A, the object is a food dish, and the annotation is placed in a quadrant having the least saliency with respect to the food dish. In FIG. 5B, the object is lightning, and the annotation is placed in a quadrant having the least saliency with respect to the lightning. However, the object is not limited to the foregoing objects as explained herein, other objects may be substituted therefor, without departing from the inventive scope. For example, but not by way of limitation, the object may be a face, the annotation may be placed in a quadrant having the least saliency with respect to the face.

According to the example implementations, results may be evaluated in one or more manners. For example, but not by way of limitation, one measure of performance may be a degree of effectiveness with respect to object annotations. Another measure performance may be a degree of sharability of the final image. One or more surveys may be used to obtain user feedback and evaluate the one or more measures of performance.

Figure 6:
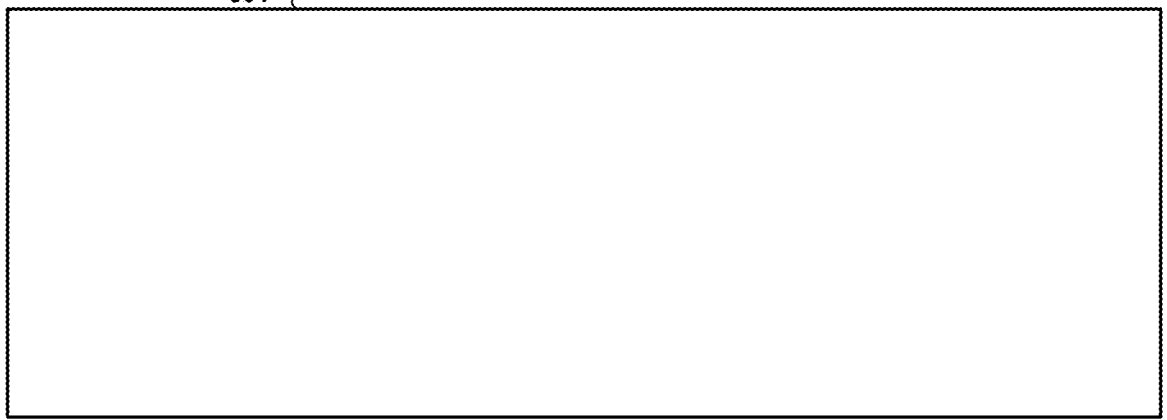
FIGS. 6, 7A, 7B, 8A and 8B illustrate evaluation results according to the example implementations.

FIG. 6 shows an example of a survey 600 according to the example implementations. More specifically, for a given image to be displayed at region 601, a user is provided with a survey 603 that includes a series of statements, and provided with input options to determine a level of agreement or disagreement the statements. In this example implementation the statements are associated with the users agreement with respect to the capturing, sharing and printing of the image, as well as whether the photo is aesthetically pleasing, interesting and engaging. As an outcome of the survey, the system will be able to collect information on whether the user likes the photos, if they take similar photos, and if they would share the photos.

Figure 7A:
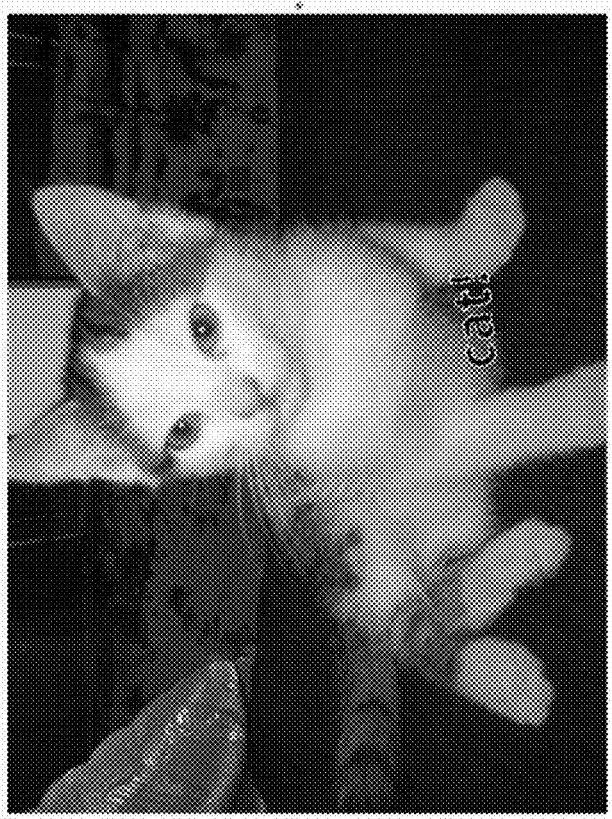
Figure 7B:

FIGS. 7A and 7B provide additional surveys according to the example implementations. In these drawings, the captured image is identical, while the annotation is different, "cat!" in FIG. 7A at 701, and "meow!" in FIG. 7B at 703. While two different annotations are shown in this example, the present example implementations are not limited thereto, and the number of annotations may be determined by the system or system operator, as would be understood by those skilled in the art. In this survey, the user is asked about the degree to which they find the photo interesting gauging, whether they share the photo, and whether they would print the photo.

Figure 8A:
Figure 8B:

FIGS. 8A and 8B provide additional surveys 800 according to the example implementations. More specifically, the users are provided with a set of identical photos having different annotations. Then the users requested to pick the combination of image and annotation that they prefer.

The survey results have indicated that the images with annotations have a more positive response with respect to enjoyment and sharability, as compared with object based annotations (e.g., related art), which are determined to have neutral or negative effect respect to the enjoyment of the photograph. On the other hand, the ideophone—based annotations may increase the enjoyment or sheer ability of a photo. More specifically, onomatopes are indicated as having an optimal performance, subject to language constraints.

In addition to the foregoing example survey approaches, other approaches may be substituted therefor. For example but not by way of limitation, another example survey may test the preferences of the user with respect to their own photos, using a specially fabricated, nonnetwork connected camera, which has no viewfinder and prints the AI annotated photos to a Wi-Fi attached printer. For example, but not by way of limitation, such devices 901, 903 are illustrated in FIGS. 9A and 9B.

Optionally, the camera may be a mobile, standalone lightweight device. Further, the camera may be self-contained, such that it is not connected to the cloud of, Wi-Fi network, or other telecommunications source. Accordingly, the camera may be able to provide processing without requiring external input. Such an approach may also be employed in coordination with other audiovisual hardware, including but not limited to hardware for augmented reality, virtual reality or other approaches.

Figure 10:
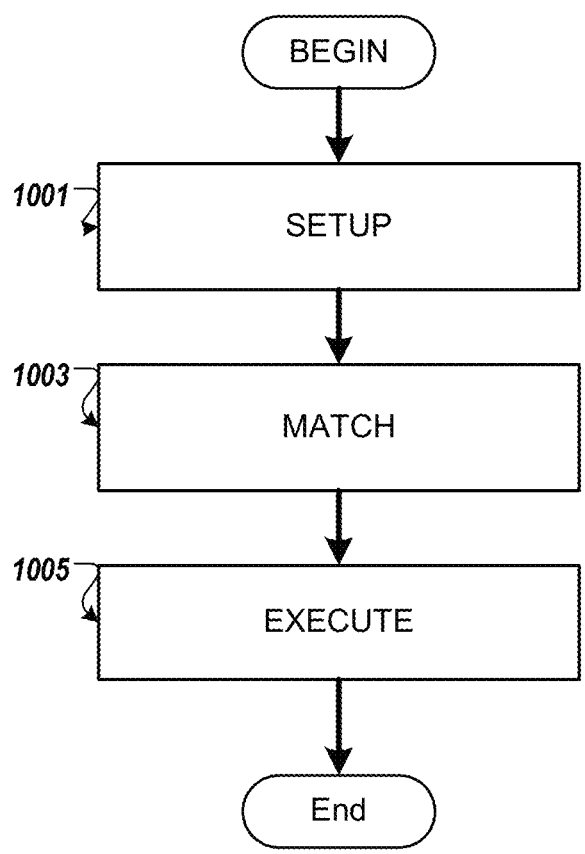
FIG. 10 illustrates an example process for some example implementations.

FIG. 10 illustrates an example process 1000 according to the example implementations. The example process 1000 may be performed on one or more devices, as explained herein.

At 1001, information is received and processed to generate a dictionary of ideophones or onomatopoeia, as explained above.

At 1003, matching is performed based on the application of the classifier to generate a term recommendation, as also described above.

At 1005, an execution operation is performed, to place the term in the non-salient region, and optionally, sharing, printing or the like, as discussed above as well.

Figure 11:
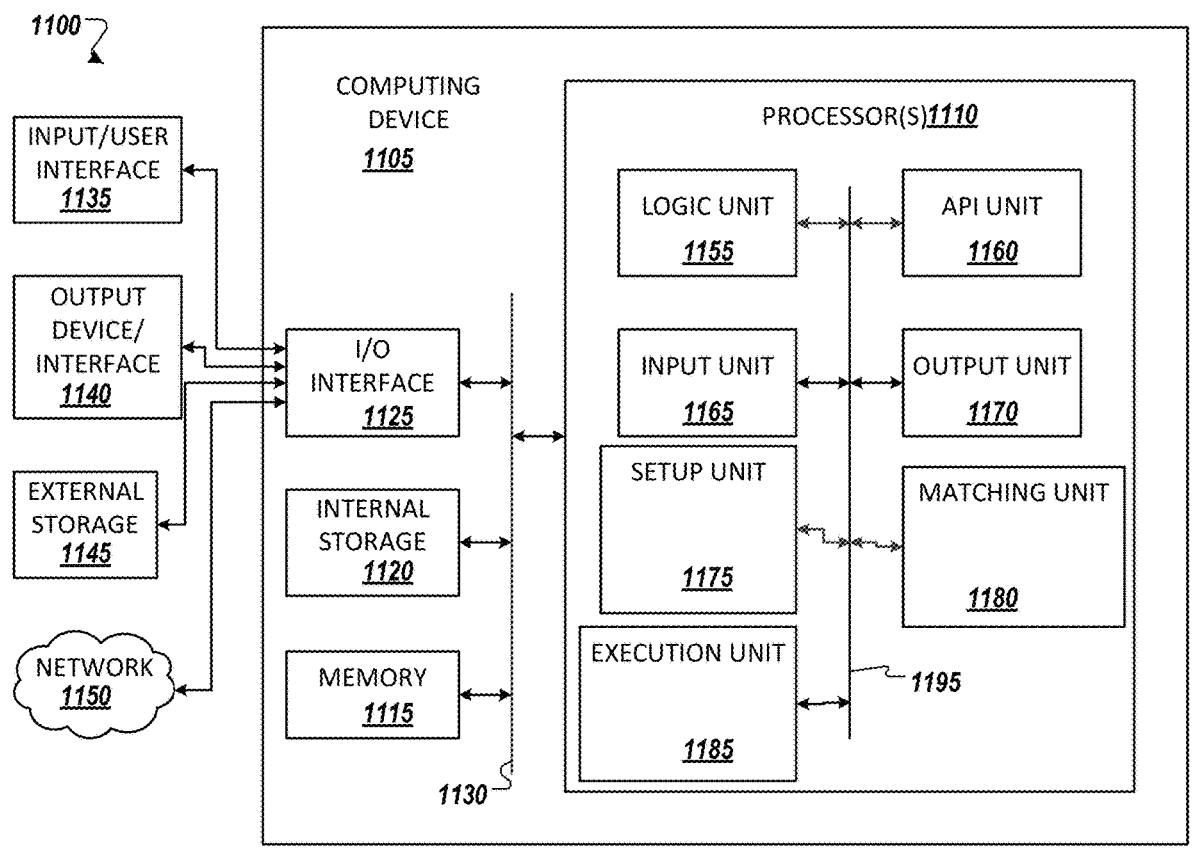
FIG. 11 illustrates an example computing environment with an example computer device suitable for use in some example implementations.

FIG. 11 illustrates an example computing environment 1100 with an example computer device 1105 suitable for use in some example implementations. Computing device 1105 in computing environment 1100 can include one or more processing units, cores, or processors 1110, memory 1115 (e.g., RAM, ROM, and/or the like), internal storage 1120 (e.g., magnetic, optical, solid state storage, and/or organic), and/or I/O interface 1125, any of which can be coupled on a communication mechanism or bus 1130 for communicating information or embedded in the computing device 1105.

According to the present example implementations, the processing associated with the neural activity may occur on a processor 1110 that is the central processing unit (CPU). Alternatively, other processors may be substituted therefor without departing from the inventive concept. For example, but not by way of limitation, a graphics processing unit (GPU), and/or a neural processing unit (NPU) may be substituted for or used in combination with the CPU to perform the processing for the foregoing example implementations.

Computing device 1105 can be communicatively coupled to input/interface 1135 and output device/interface 1140. Either one or both of input/interface 1135 and output device/interface 1140 can be a wired or wireless interface and can be detachable. Input/interface 1135 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 1140 may include a display, television, monitor, printer, speaker, braille, or the like. In some example implementations, input/interface 1135 (e.g., user interface) and output device/interface 1140 can be embedded with, or physically coupled to, the computing device 1105. In other example implementations, other computing devices may function as, or provide the functions of, an input/interface 1135 and output device/interface 1140 for a computing device 1105.

Examples of computing device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1105 can be communicatively coupled (e.g., via I/O interface 1125) to external storage 1145 and network 1150 for communicating with any number of networked components, devices, and systems, including one or more computing devices of the same or different configuration. Computing device 1105 or any connected computing device can be functioning as, providing services of, or referred to as, a server, client, thin server, general machine, special-purpose machine, or another label. For example but not by way of limitation, network 1150 may include the blockchain network, and/or the cloud.

I/O interface 1125 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computing device 1105 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1110 can execute under any operating system (OS) (not shown), in a native or virtual environment. One or more applications can be deployed that include logic unit 1155, application programming interface (API) unit 1160, input unit 1165, output unit 1170, setup unit 1175, matching unit 1180, execution unit 1180, and inter-unit communication mechanism 1195 for the different units to communicate with each other, with the OS, and with other applications (not shown).

For example, the setup unit 1175, the matching unit 1180, and the execution unit 1180 may implement one or more processes shown above with respect to the structures described above. The described units and elements can be varied in design, function, configuration, or implementation and are not limited to the descriptions provided.

In some example implementations, when information or an execution instruction is received by API unit 1160, it may be communicated to one or more other units (e.g., logic unit 1155, input unit 1165, setup unit 1175, matching unit 1180, and execution unit 1180).

For example, the setup unit 1175 may receive and process information (e.g., dictionary or the like), to generate a dictionary of ideophones or onomatopoeia, as explained above. An output of the setup unit 1175 is provided to the matching unit 1180, which performs the necessary operations based on the application of the classifier to generate a term recommendation, as also described above. Additionally, the execution unit 1180 may provide an output, such as a placement of the term in the non-salient region, and optionally, sharing, printing or the like, based on the outputs of the setup unit 1175 and the matching unit 1180.

In some instances, the logic unit 1155 may be configured to control the information flow among the units and direct the services provided by API unit 1160, input unit 1165, setup unit 1175, matching unit 1180, and execution unit 1180 in some example implementations described above. For example, the flow of one or more processes or implementations may be controlled by logic unit 1155 alone or in conjunction with API unit 1160.

Figure 12:
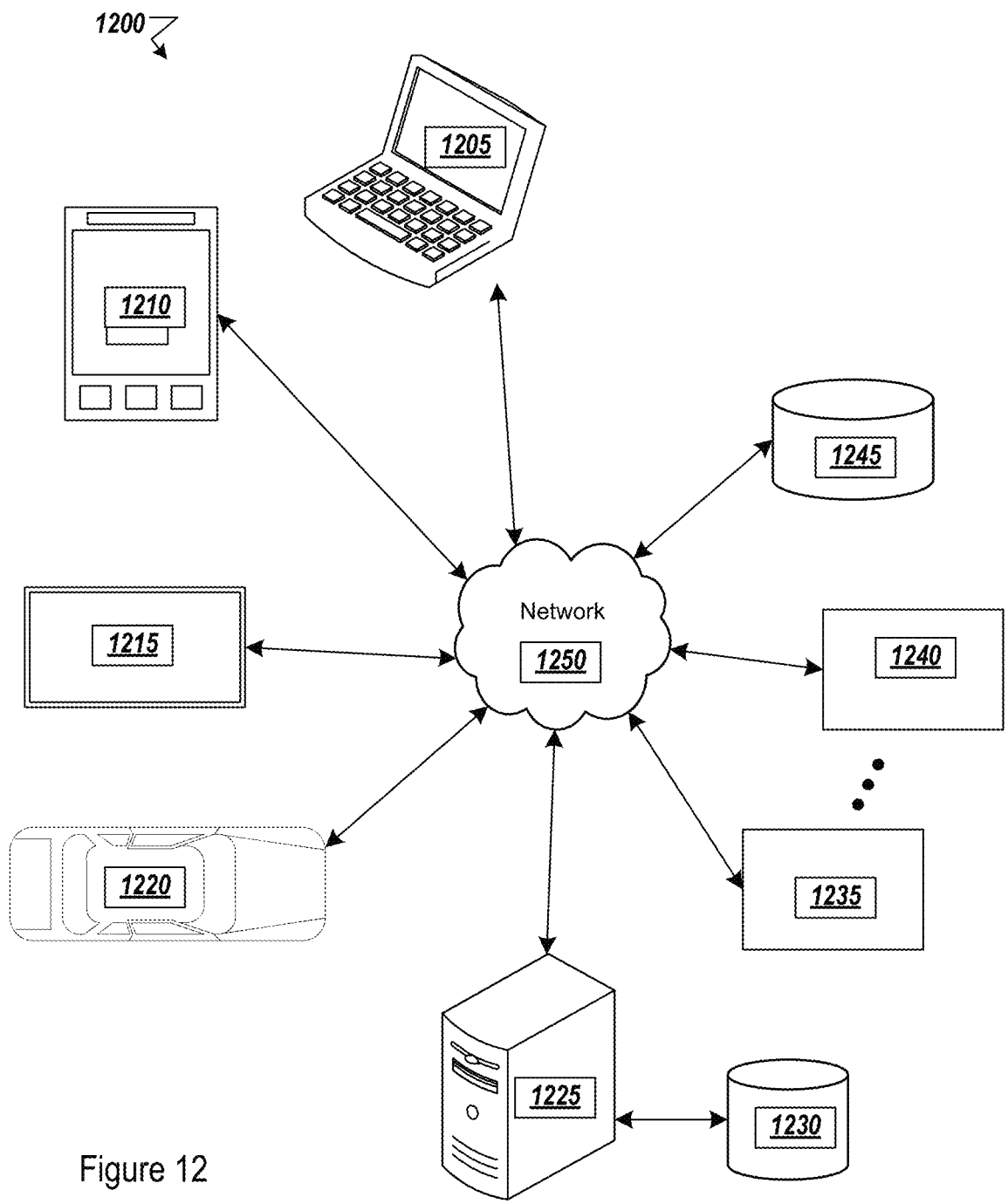
FIG. 12 shows an example environment suitable for some example implementations.

FIG. 12 shows an example environment suitable for some example implementations. Environment 1200 includes devices 1205-1245, and each is communicatively connected to at least one other device via, for example, network 1260 (e.g., by wired and/or wireless connections). Some devices may be communicatively connected to one or more storage devices 1230 and 1245.

An example of one or more devices 1205-1245 may be computing devices 1105 described in FIG. 11, respectively. Devices 1205-1245 may include, but are not limited to, a computer 1205 (e.g., a laptop computing device) having a monitor and an associated webcam as explained above, a mobile device 1210 (e.g., smartphone or tablet), a television 1215, a device associated with a vehicle 1220, a server computer 1225, computing devices 1235-1240, storage devices 1230 and 1245.

In some implementations, devices 1205-1220 may be considered user devices associated with the users, who may be remotely obtaining a sensed input used as inputs for the foregoing example implementations. In the present example implementations, one or more of these user devices may be associated with one or more sensors such as cameras and/or microphones, that can sense information as needed for the present example implementations, as explained above.

While the foregoing example implementations are directed to a relation between a word and an object class, the present inventive concept is not limited thereto, and other aspects may be substituted therefor, or added. For example, but not by way of limitation, instead of a term being placed on the image as the ideophone, other content may be placed on the image in the non-salient region, including but not limited to emoji, sticker, icon, or other indicia as would be understood by those skilled in the art.

Further, the present example implementations are disclosed with respect to the image or photo level (e.g., classification of an object in an image). However, the example implementations are not limited to the object level. For example, but not by way of limitation, the mapping may be performed at the pixel level instead of at the object level.

Additionally, the foregoing example implementations disclose images, which may be received from a storage or captured by an image capture device such as a camera that is standalone, in a mobile phone, etc. However, the example implementations may be directed to videos as well. Further, the example implementations may be directed not only to a camera device, but also to applications associated with a camera device, including but not limited to a video editor, a camera application on the phone, a photo book, a kiosk, or other system where a user may select or capture an image or video to be viewed, or a previously stored image or video.

Further, the example implementations may include interactive aspects (e.g., user may may interact with the annotation, or provide direct feedback or comment into the annotation). Alternatively, the example implementations may be used in situations where assistance is desired for users that may have communication difficulty (e.g., hearing-impaired user may be able to comprehend not just the language associated with an object, but the concept associated with the object, in the image).

According to another example implementation, a replacement or enhancement for close-captioned television and media. In related art approaches, the close-captioned audio associated with a video appears across the bottom of a user interface. By integrating the example implementations, the ideophones may be added to a video on a frame-by-frame basis, to provide not only the text associated with the video images on the display, but also providing information of the sounds and concepts associated with the video image.

This aspect may provide a substantially different user experience for close-captioned videos, such that content during which there is limited verbal captioning, but other video that is associated with a sound and a concept, can be provided to the user. For example, an ideophone that shows a visual representation associated ice cubes making a sound when being dropped into a glass, during suspenseful content in a show or a movie, may provide the user with a sense of the level of suspense, or the importance of the action, thus providing more "feel" to the close captioning.

Optionally, the example implementations may be applied to audio-only content in a video, such that a sound not associated with an image can be visually demonstrated. For example, but not by way of limitation, the sound associated with an explosion that is not in the image, can be represented on a visual output according to the example implementations. In such an approach, the classifier would be executed on audio information, as opposed to video or image information, in a manner similar to that described above.

The foregoing example implementations may have various benefits and advantages with respect to the related art.

For example, but not way of limitation, the example implementations may extend across languages, provided that a dictionary is available. Further, the map may label to close the semantic distances. For example, but not by way of limitation, lorry may be mapped to truck, which may be mapped to car/vehicle. Further, the example implementations may be expanded to scene graphs, and the sparse language model dictionary may be compressed, to work in an embedded manner in the edge device, without requiring a cloud connection.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

What is claimed is:

1. A computer-implemented method of associating an annotation with an object in an image, comprising:
   generating a dictionary including first vectors that associate terms of the annotation with concepts;
   classifying the image to generate a second vector based on classified objects and associated confidence scores for the classified objects;
   selecting a term of the terms associated with one of the first vectors having a shortest determined distance to the second vector;
   identifying a non-salient region of the image; and
   rendering the annotation associated with the selected term at the non-salient region.

2. The computer-implemented method of claim 1, wherein the rendering is formed automatically without requiring an input from a user.

3. The computer-implemented method of claim 1, wherein the classifying comprises applying one or more of a first classifier associated with detection of a face and classification of an expression of the face, a second classifier associated with classification of food, and a third classifier associated with classification of an item in the image.

4. The computer-implemented method of claim 3, wherein the classification scores comprise a floating points score between 0 and 1, wherein 0 is indicative of a frown on the face and 1 is indicative of a smile on the face.

5. The computer-implemented method of claim 1, wherein the determining the non-salient region of the image comprises detecting contours of the image, dividing the image into regions based on its midpoint, and selecting one of the regions having a lowest level of overlap of the contours of the image.

6. The computer-implemented method of claim 1, wherein determining the shortest determined distance comprises calculation of a cosine distance between the second vector and each of the first vectors.

7. The computer-implemented method of claim 1, wherein the computer implemented method is executed a standalone device or a cloud connected device as one or more of a video editor, and online photo application and a photo book.

8. The computer-implemented method of claim 1, wherein the terms comprise one or more of words, languages, fonts and colors, and the one or more of sounds and sentiments.

9. The computer-implemented method of claim 1, wherein the image comprises a frame of a video, the object is a face, and the annotation is associated with an audio output of the face.

10. The computer-implemented method of claim 1, wherein the image comprises a frame of a video, the object is an item, and the annotation is associated with an audio output based on a movement of the object.

11. A non-transitory computer readable medium having a storage that stores instructions associating an annotation with an object in an image, the instructions executed by a processor, the instructions comprising:
   generating a dictionary including first vectors that associate terms of the annotation with concepts;
   classifying the image to generate a second vector based on classified objects and associated confidence scores for the classified objects;
   selecting a term of the terms associated with one of the first vectors having a shortest determined distance to the second vector;
   identifying a non-salient region of the image; and
   rendering the annotation associated with the selected term at the non-salient region.

12. The computer-implemented method of claim 1, wherein the rendering is formed automatically without requiring an input from a user.

13. The computer-implemented method of claim 1, wherein the classifying comprises applying one or more of a first classifier associated with detection of a face and classification of an expression of the face, a second classifier associated with classification of food, and a third classifier associated with classification of an item in the image.

14. The computer-implemented method of claim 3, wherein the classification scores comprise a floating points score between 0 and 1, wherein 0 is indicative of a frown on the face and 1 is indicative of a smile on the face.

15. The computer-implemented method of claim 1, wherein the determining the non-salient region of the image comprises detecting contours of the image, dividing the image into regions based on its midpoint, and selecting one of the regions having a lowest level of overlap of the contours of the image.

16. The computer-implemented method of claim 1, wherein determining the shortest determined distance comprises calculation of a cosine distance between the second vector and each of the first vectors.

17. The computer-implemented method of claim 1, wherein the computer implemented method is executed a standalone device or a cloud connected device as one or more of a video editor, and online photo application and a photo book.

18. The computer-implemented method of claim 1, wherein the terms comprise one or more of words, languages, fonts and colors, and the one or more of sounds and sentiments.

19. The computer-implemented method of claim 1, wherein the image comprises a frame of a video, the object is a face, and the annotation is associated with an audio output of the face.

20. The computer-implemented method of claim 1, wherein the image comprises a frame of a video, the object is an item, and the annotation is associated with an audio output based on a movement of the object.

* * * * *